(12) United States Patent
Webber (10) Patent No.: US 9,468,151 B2
(45) Date of Patent: Oct. 18, 2016

(54) LAWN MAINTENANCE DEVICE (71) Applicant: Bruce Webber, Wheaton, IL (US)

(72) Inventor: Bruce Webber, Wheaton, IL (US)

(*) Notice: Subject to any disclaimer, the term of this patent is extended or adjusted under 35 U.S.C. 154(b) by 53 days.

(21) Appl. No.: 14/289,769

(22) Filed: May 29, 2014

(65) Prior Publication Data
US 2015/0342115 A1 Dec. 3, 2015

(51) Int. Cl.
A01G 3/06 (2006.01)
A01G 1/08 (2006.01)
A01G 1/12 (2006.01)

(52) U.S. Cl.
CPC . A01G 3/06 (2013.01); A01G 1/08 (2013.01); A01G 1/12 (2013.01)

(58) Field of Classification Search
CPC .......... A01G 3/062; A01G 3/06; A01G 1/08; A01G 1/12
See application file for complete search history.

(56) References Cited

U.S. PATENT DOCUMENTS

| | | | | | |
|---|---|---|---|---|---|
| 2,654,180 | A | * | 10/1953 | Redfield | A01G 3/06 172/15 |
| 2,662,342 | A | * | 12/1953 | Peterson | A01G 1/08 172/15 |
| 2,939,262 | A | * | 6/1960 | Orr, Sr. | A01G 3/062 56/10.1 |
| 2,952,110 | A | * | 9/1960 | Blanchard | A01G 3/062 56/10.1 |
| 3,086,596 | A | * | 4/1963 | Allegretti | A01G 3/062 16/110.1 |
| 3,217,480 | A | * | 11/1965 | Orr | A01G 3/06 56/256 |
| 3,346,053 | A | * | 10/1967 | Allegretti | A01G 3/06 172/16 |
| 3,358,431 | A | * | 12/1967 | Fitzgerald, Jr. | A01G 3/062 56/17.5 |
| 3,768,569 | A | * | 10/1973 | Nunnery | A01G 3/06 172/17 |
| 4,046,200 | A | * | 9/1977 | Mullet | A01G 3/062 172/14 |
| 4,663,883 | A | * | 5/1987 | Hilliard | A01G 1/08 47/33 |
| 6,385,898 | B1 | * | 5/2002 | Noel | A01G 1/08 47/33 |
| 6,449,897 | B1 | * | 9/2002 | Gaston | A01G 1/08 47/33 |
| 7,467,492 | B2 | * | 12/2008 | Hall | A01G 1/08 47/33 |
| 2007/0074614 | A1 | * | 4/2007 | Sobel | B26D 1/045 83/614 |
| 2008/0223590 | A1 | * | 9/2008 | Hall | A01G 3/06 172/17 |
| 2009/0255695 | A1 | * | 10/2009 | Breneman | A01G 3/062 172/15 |
| 2010/0224378 | A1 | * | 9/2010 | Peterson | A01G 3/062 172/15 |
| 2013/0175062 | A1 | * | 7/2013 | Street | A01G 3/062 172/15 |
| 2013/0228351 | A1 | * | 9/2013 | Stark | A01G 3/062 172/15 |

OTHER PUBLICATIONS

David Rossouw, Dec. 18, 2009, Materials Engineering Newsletter, vol. 1. Issue 5, p. 1.*

* cited by examiner

Primary Examiner — Robert Pezzuto
Assistant Examiner — Adam Behrens
(74) Attorney, Agent, or Firm — Justin Lampel (57) ABSTRACT A lawn maintenance device is provided. The lawn maintenance device has a generally planar rail system which is permanently inserted into the ground. The top portion of the rail system remains above ground while the remainder of the rail system is underground. A movable tool having a corresponding groove which aligns with the rail runs along the rail and a blade attached to the movable tool trims the lawn or vegetation. The rail provides a thin section of vegetation which can be easily cut.

4 Claims, 11 Drawing Sheets

LAWN MAINTENANCE DEVICE

CROSS REFERENCE TO RELATED APPLICATION

The following application is based on and claims the priority benefit of U.S. provisional application Ser. No. 61/828,712 filed on May 30, 2013; the entire contents of which are incorporated by reference.

BACKGROUND OF THE INVENTION

A lawn maintenance device is provided. The lawn maintenance device has a generally planar rail system which is permanently inserted into the ground. The top portion of the rail system remains above ground while the remainder of the rail system is underground. A movable tool having a corresponding groove which aligns with the rail runs along the rail and a blade attached to the movable tool trims the lawn or vegetation. The rail provides a thin section of vegetation which can be easily cut.

Over the years, attempts have been made to provide a lawn maintenance device which effectively trims a lawn or hedges. The strategy has been to cut down well below the surface into the soil alongside a sidewalk for example. For example, U.S. Pat. No. 7,540,093 to Yeh discloses a pair of gardening shears having a handle, a drive member, a control lever, a transmission device, and two cutting blades. The transmission device includes a housing, a pivot plate, a catch plate, a link, a catch flange, a restoring member. Thus, the restoring member is biased between the catch flange and the catch plate, so that the restoring member is not subjected to a pulling force to prevent the restoring member from being worn out by a pulling force during a long-term utilization. In addition, when the pivot head of the handle is rotatable relative to the housing, the stop post of the pivot head is movable to rest on the pivot plate to prevent the pivot plate from directly rubbing the inner wall of the pivot head. Further, U.S. Pat. No. 2,654,180 to Redfield discloses lawn maintenance system having a rail.

Still further, U.S. Pat. No. 7,930,833 to Baskar discloses a portable, hand-operated trimmer having a head module that is removably connected to a power control module. The head module has a power head enclosing an electric motor that is operatively connected to a trimming blade. The power head is selectably settable in a plurality of angular positions with respect to a head support, including a neutral position representing 0 degree rotation, 45 degree flexion and dorsiflexion positions, and 90 degree flexion and dorsiflexion positions. The power head also encloses a stator cartridge that is connected to the housing of the power head by a plurality of fastening members. The head support rotates about the stator cartridge and is engaged by way of a movable engagement pin that is received within a selected recess defined in the stator cartridge. The power head housing and stator cartridge further define molded sockets to receive corresponding pivot arms of the head support. An O-ring is disposed about one of the pivot arms to dampen free rotation. The power control module provides power to the power head through a removable rechargeable battery or through direct connection to conventional household power.

However, these patents fail to describe a lawn maintenance device which is easy to use and efficient as is described in the present application. Further, these patents fail to describe a lawn maintenance device having a rail system which precisely maintains a lawn.

SUMMARY OF THE INVENTION

A lawn maintenance device is provided. The lawn maintenance device has a generally planar rail system which is permanently inserted into the ground. The top portion of the rail system remains above ground while the remainder of the rail system is underground. A movable tool having a corresponding groove which aligns with the rail runs along the rail and a blade attached to the movable tool trims the lawn or vegetation. The rail provides a thin section of vegetation which can be easily cut.

An advantage of the present lawn maintenance device is that the present device accurately trims grass and/or bushes.

Another advantage of the present law maintenance device is that the present lawn maintenance device has a protected blade which therein reduces the risk of injury.

Still another advantage of the present law maintenance device is that the present lawn maintenance device has a rail system which, once installed, remains secured in the ground.

Another advantage of the present lawn maintenance device is that the present lawn maintenance device may have an extended ledge portion which prevents the device from being inserted into the ground beyond a specific optimal point.

Yet another advantage of the present law maintenance device is that the present law maintenance device has a movable tool which easily glides over a rail system for quickly manicuring a lawn.

Still another advantage of the present lawn maintenance device is that the present device does not require a power source and may be powered simply by sliding a movable tool unit over a rail by hand.

And another advantage of the present lawn maintenance device is that the present device may be used by individuals of various heights as a result of the rotating movable handle.

Yet another advantage of the present lawn maintenance device is that the present device may allow a lighting fixture to be secured to a cutting rail system without the lighting fixture interfering with the trimming of the lawn.

Still another advantage of the present lawn maintenance device is that the present device may be retrofitted for a brick paver edge.

For a more complete understanding of the above listed features and advantages of the present lawn maintenance device, reference should be made to the detailed description and the accompanying drawings. Further, additional features and advantages of the invention are described in, and will be apparent from, the detailed description of the preferred embodiments.

DETAILED DESCRIPTION OF THE PREFERRED EMBODIMENTS

A lawn maintenance device is provided. The lawn maintenance device has a generally planar rail system which is permanently inserted into the ground. The top portion of the rail system remains above ground while the remainder of the rail system is underground. A movable tool having a corresponding groove which aligns with the rail runs along the rail and a blade attached to the movable tool trims the lawn or vegetation. The rail provides a thin section of vegetation which can be easily cut.

Figure 1:
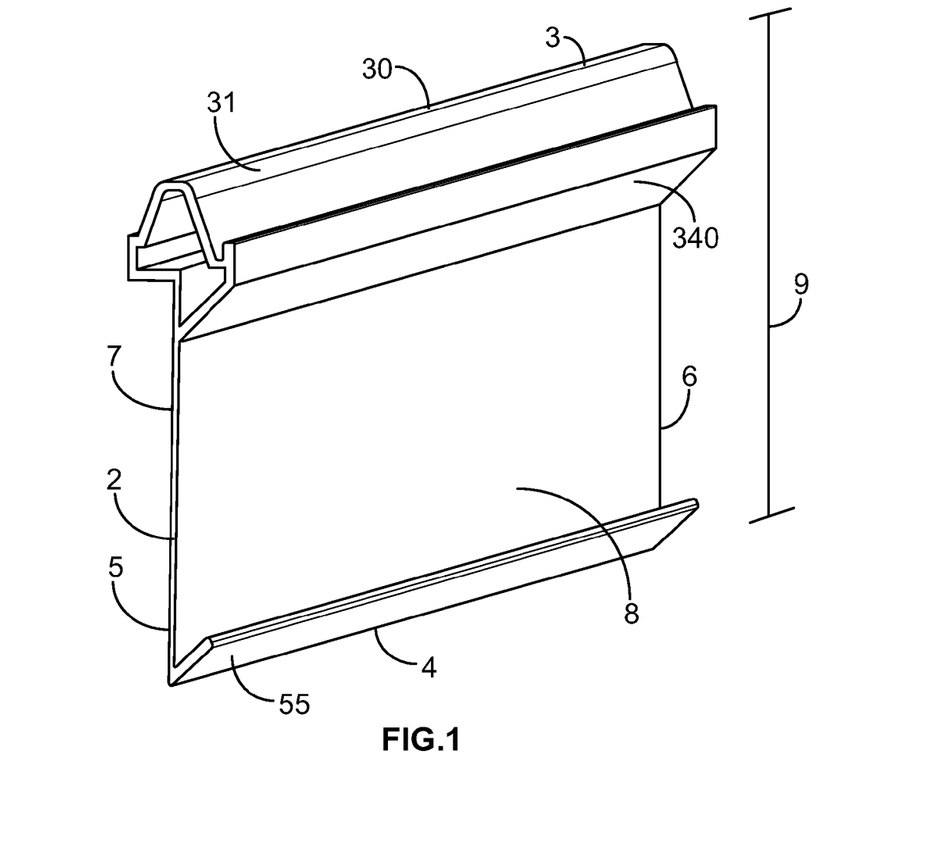
FIG. 1 illustrates a perspective view of the rail system unit of the lawn maintenance device.
Figure 1A:
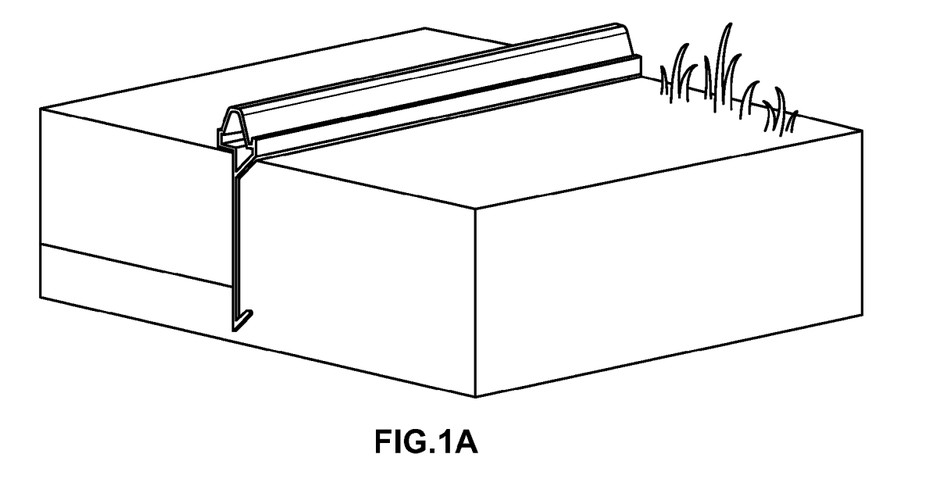
FIG. 1A illustrates a perspective view of the rail system installed.
Figures 3, 4:
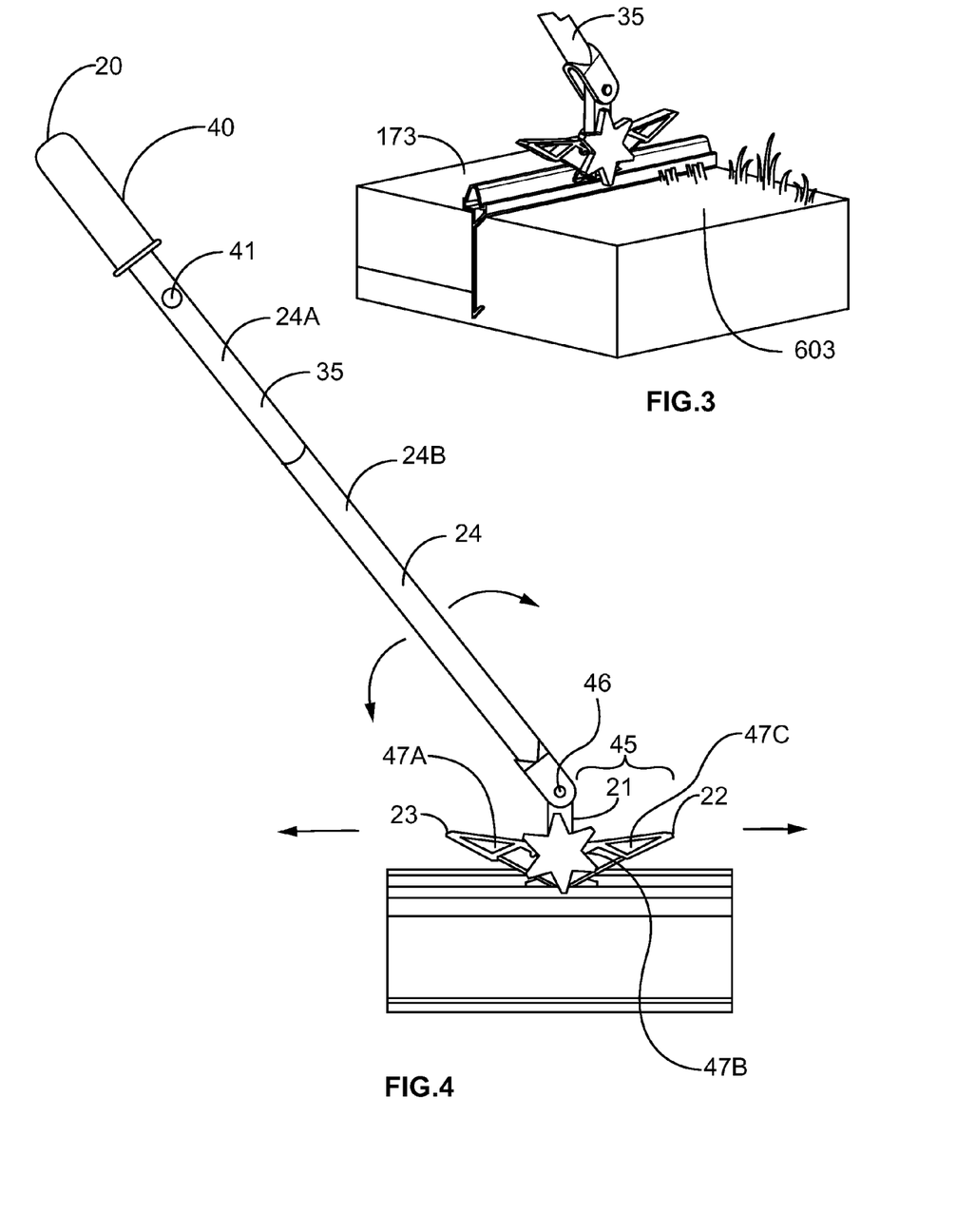
FIG. 3 illustrates a perspective view of the movable tool inserted on the rail system.
FIG. 4 illustrates a side view of the movable tool unit of the lawn maintenance device inserted on the rail system.
Figure 12:
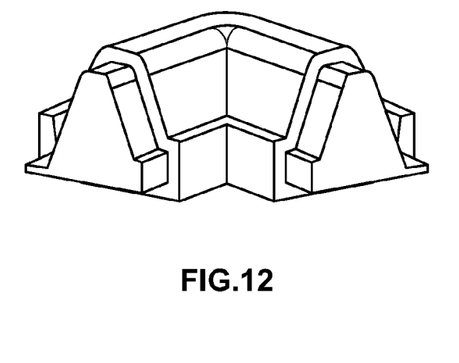
FIG. 12 illustrates a left corner section for the rail system unit.
Figure 13:
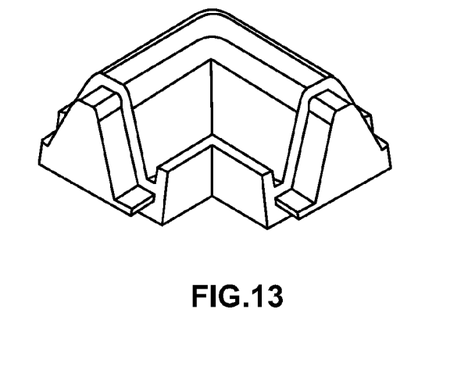
FIG. 13 illustrates a right corner section for the rail system unit.

Referring now to the figures, the present lawn maintenance device 1 (FIG. 6) may have a rail system unit 2 (FIG. 1) and a movable tool unit 35 (FIG. 4). The rail system unit 2 may have a top 3, a bottom 4, a front 5, a back 6, a first side 7 and a second side 8. The front 5 and the back 6 of the rail system unit 2 may have a height 9 (FIG. 1). The rail system unit 2 may be substantially flat (in the mid-section) and rectangular in shape. In an embodiment, the rail system unit 2 is made from a durable material which can withstand prolonged exposure to the outside elements. In an embodiment, the rail system unit 2 is made from a generally flexible material, such as a hard plastic or rubber, which may be easily bent into a desired shape while still being sturdy. Further, in an embodiment, the rail system unit 2 may have corner sections (FIGS. 12 and 13) which allow the device to be used in a landscaping of virtually any shape.

Figure 2:
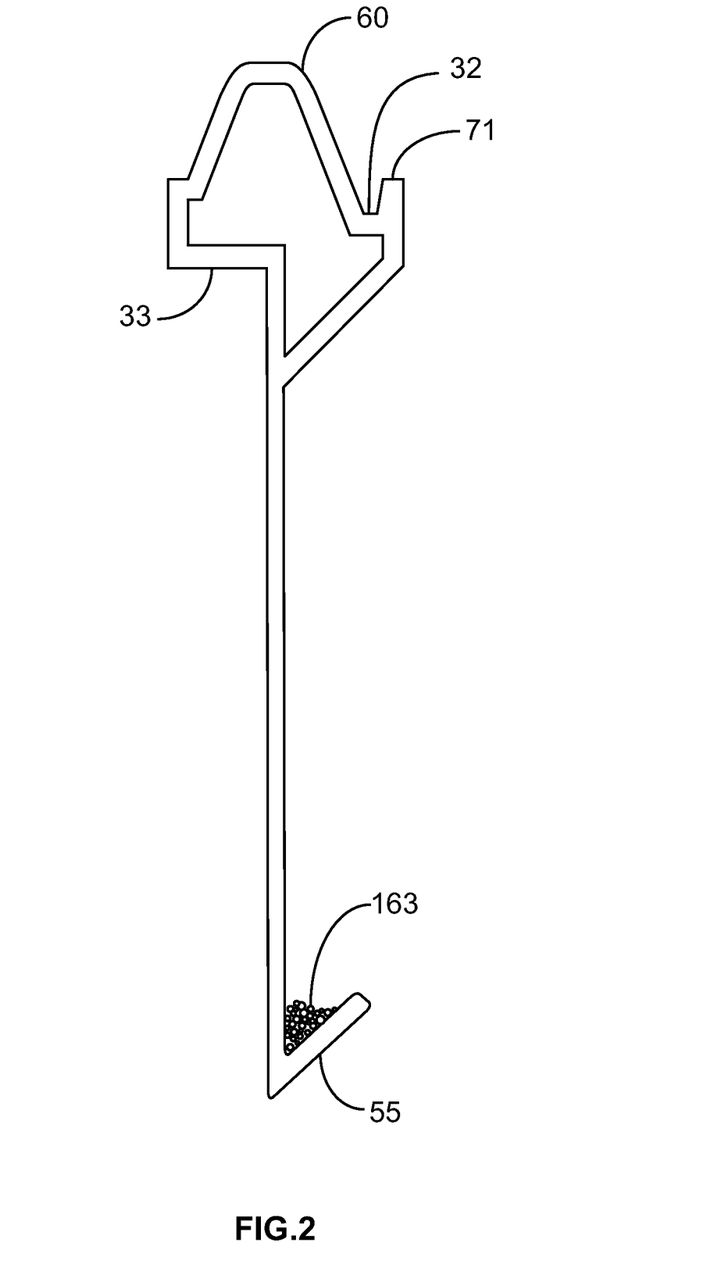
FIG. 2 illustrates a front view of the rail system unit of the lawn maintenance device.

In an embodiment, the bottom 4 of the rail system unit 2 may have a wedged-shaped anchor 55 (FIG. 2). The wedged-shaped anchor 55 may provide additional stability once the rail system unit 2 is secured into the ground 173 (FIG. 5) as the wedged-shaped anchor 55 has little resistance when being inserted into the ground 173, but will have a much greater resistance moving in the upward direction. In particular, dirt 163, rocks, cement or other items may be placed over the wedged-shaped anchor 55 to prevent the rail system unit 2 from accidentally becoming dislodged from the ground 173. In use, the bottom 4 of the rail system unit 2 (and therefore the wedged-shaped anchor 55) is underground.

Figure 16:
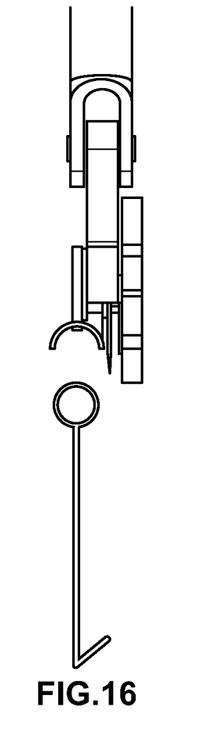
FIG. 16 illustrates a front view of the device wherein the rail system unit has a cylindrical top for use on standard lawn edging.
Figure 17:
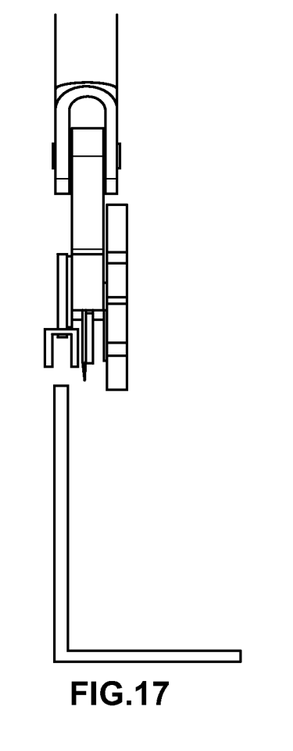
FIG. 17 illustrates a front view wherein the rail system unit has a generally flat top for use on standard paver edging.
Figure 18:
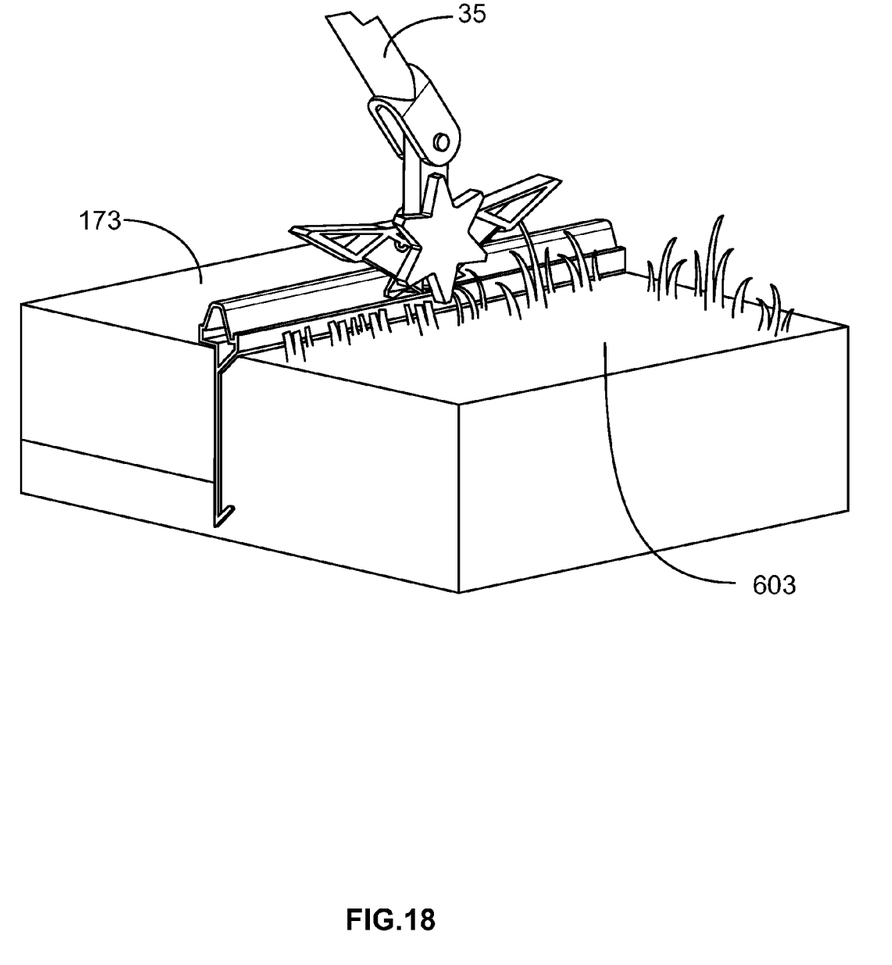
FIG. 18 illustrates the device cutting the grass of a lawn.

The top 3 of the rail system unit 2 may have an elongated contact surface 30 which runs along the entire length of the top 3 of the rail system unit 2. In an embodiment, the elongated contact surface 30 may have an upper curved arched portion 31, a generally flat cutting portion 32 (FIG. 5A) wherein the generally flat cutting portion 32 runs substantially parallel with the ground and a generally flat ledge portion 33 which also runs substantially parallel with the ground (and therein generally perpendicular to the main body of the rail system unit 2). In an embodiment, the generally flat cutting portion 32 maybe on the opposite side of the rail system unit 2 as the generally flat ledge portion 33. Further, in an embodiment, the generally flat cutting portion 32 may be closer to the top 3 of the rail system unit 2 then the generally flat ledge portion 33. In an embodiment, the top 3 of the rail system unit 2 may have various other shapes (FIGS. 9, 16 and 17).

Referring now to FIGS. 9B, 9C, 9D and 10, in an embodiment, the top 3 of the rail system unit 2 may have an alternative elongated opening groove 327. The alternative elongated opening groove 327 may be used in an alternative embodiment wherein the cutting of the grass or bushes takes place (and wherein a blade 50 is placed as discussed below) on the top 3 of the rail system unit 2 as opposed to the cutting taking place on the side of the rail system unit 2 (as is illustrated in FIG. 1).

Figure 5:
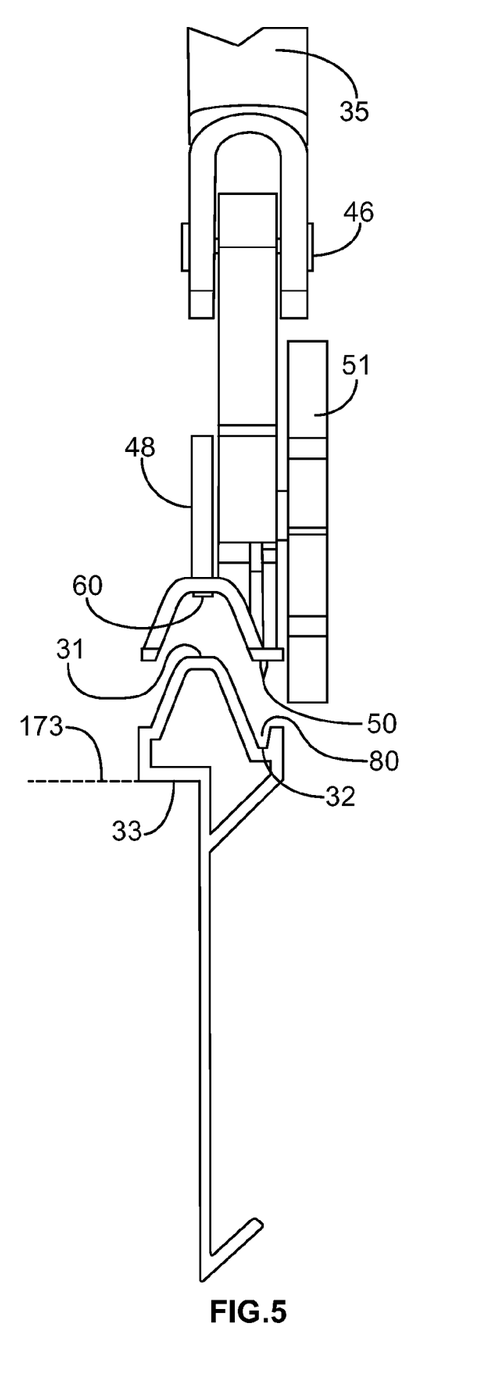
FIG. 5 illustrates a front view of the movable tool above the rail system.
Figure 9A:
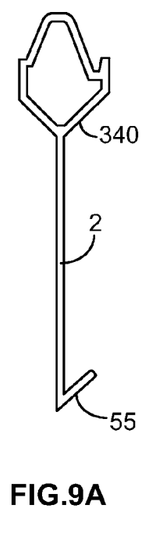
FIGS. 9A-F illustrates various different embodiments of the rail system unit.
Figure 9B:
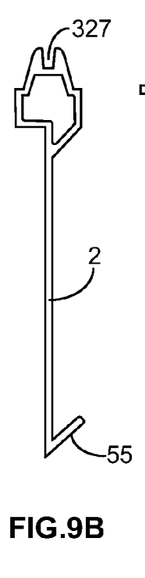
Figure 9C:
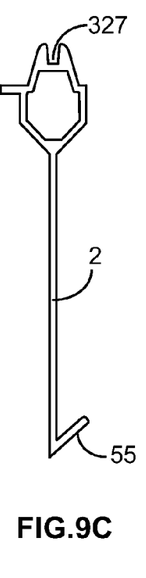

In an embodiment, the rail system unit 2 is inserted into the ground 173 up to the generally flat ledge portion 33 (FIG. 5). As a result, the generally flat ledge portion 33 acts as a stop so that when the rail system unit 2 is inserted into the ground 173, the generally flat ledge portion 33 acts to stop the rail system unit 2 from further descending into the ground 173. Further, the generally flat ledge portion 33 may act as an overhang for a sidewalk or driveway to prevent weeds from going between sidewalk and edging. In an embodiment, the second side 8 of the rail system unit 2 (the side opposite the generally flat ledge portion 33) may have a tapered portion 340 (FIG. 1). The tapered portion 340 may be located below the generally flat cutting portion 32 and may, for example, also help prevent the rail system unit 2 from further entering the ground 173 while still being able to be partially inserted into the ground 173. In yet a further embodiment, both sides of the rail system unit 2 may have a tapered edge as is illustrated in FIGS. 9A and 9C. When inserting the rail system unit 2 into the ground, the generally flat ledge portion 33 faces the oppose side of the lawn (for example, the side facing the sidewalk) whereas the generally flat cutting portion 32 faces the side of the rail system unit 2 wherein the lawn is located.

Referring now to FIGS. 3-5A, as stated above, the present law maintenance device 1 may have a movable tool unit 35. The movable tool unit 35 may have a top 20 (FIG. 4), a bottom 21, a front 22, a back 23, and a generally cylindrical shaft portion 24. Located at the top 20 of the movable tool unit 35 may be a handle 40 for grasping and a knob 41 for controlling, for example, the pivoting of the device 1. In an embodiment, the movable tool unit 35 is electrically powered and has an on and off switch located near the handle 40. For the electrically powered embodiment, a safety mechanism for automatically shutting off the device 1 under certain circumstances is recommended, if not required by certain jurisdictions. Further, in an embodiment, the generally cylindrical shaft portion 24 may be split into multiple units 24A, 24B so as to allow the movable tool unit 35 to telescopically extend or retract into a desired length.

Located on the bottom 21 of the movable tool unit 35 may be base support 45. The base support 45 may have a pin 46 which operates as a pivot point. The pin 46 may allow the bottom 21 of the movable tool unit 35 (at the base support 45) to pivot with respect to the generally cylindrical shaft portion 24 and the handle 40. Preferably, the pin 46 allows the base support 45 to pivot approximately one hundred and eighty degrees with respect to the generally cylindrical shaft portion 24; all while the base support 45 portion remains flush with the top 3 of the rail system unit 2. As a result of the base support 45 of the movable tool unit 35 pivoting, the device 1 may be used by individuals of various heights. Further, the device 1 may therein be used to cut lawn by either pushing or pulling the device 1.

Figure 5A:
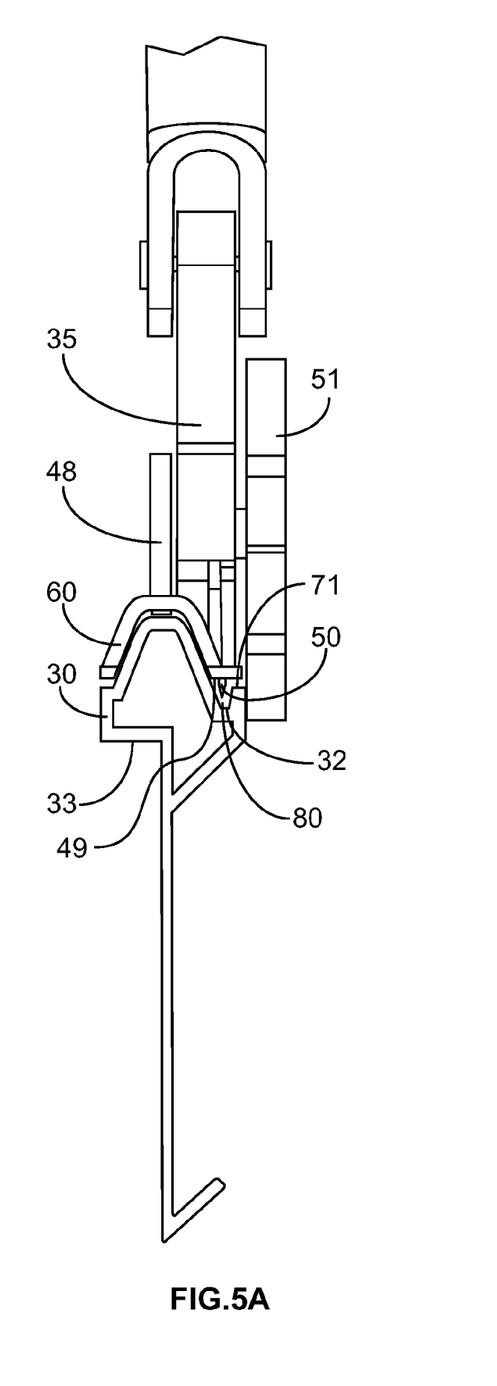
FIG. 5A illustrates a front view of the movable tool unit inserted on the rail system unit of the lawn maintenance device.

In an embodiment, the base support 45 may have three major sections 47A, 47B and 47C. Section 47B may be the center section and may separate section 47A and 47C. The pin 46 may be located above section 47B, the middle section. Sections 47A and 47C may be generally wedged-shaped, pointing away from the center section 47B. The wedged-shape of the outside sections 47A and 47C may allow the outside sections 47A and 47C to force grass 603, bushes, thin branches or other articles downward, toward a cutting edge (or blade) 50 (as described below). The cutting edge 50 is illustrated in FIGS. 5 and 5A.

Figure 6:
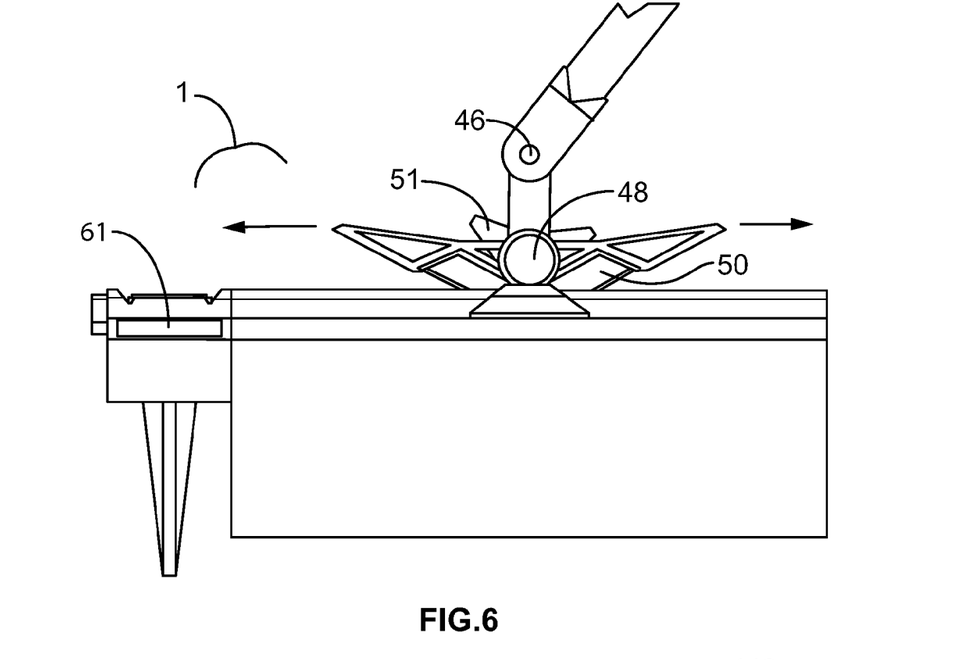
FIG. 6 illustrates a side view of the movable tool unit inserted on the rail system unit of the lawn maintenance device with a solar light inserted.

In an embodiment, there may be two cutting edges 50 which allow a user to cut in either direction. More specifically, in this embodiment, a first cutting edge 50 may be located on one side of a wheel 48 (as described below) and a second cutting edge 50 may be located on the other side of the wheel 48. As a result, the user may not have to move the base support section 45 of the movable tool unit 35 but instead may simply flip the handle 40 over the wheel 48 in order to go in the opposite direction. Further, the user may flip the movable tool 35 over the wheel 48 without the need to lift the movable tool 35 off the rail system unit 2 (where it is normally in contact with during use). In an embodiment, the location wherein the movable tool 35 directly contacts the rail system unit 2 is short enough such that a user may curve the rail system unit 2 when installed and still slide the movable tool 35 along the rail system unit 2. In an embodiment, the cutting edges 50 may be secured to the movable tool 35 at approximately a thirty to sixty degree angle with respect to the rail system unit 2. FIG. 6 illustrates the cutting edges 50 at approximately a forty-five degree angle. The angled nature of the cutting edge 50 with respect to the rail system unit 2 increases the cutting force of the cutting edge 50 with respect to the grass 603.

As stated above, the device 1 may have a wheel 48. The wheel 48 may be secured to the middle section 47B (FIGS. 5 and 6). In an embodiment, the wheel 48 may be made of rubber, plastic, metal or the like. The wheel 48 may have an axle extending at one end from its center and at the other end to a star-shape guide 51. More specifically, the axle may extend through an opening in the center section 47B and the wheel 48 may be located on one side of the center section 47B and the star-shaped guide 51 may be located on the other side of the center section 47B.

Figure 19:
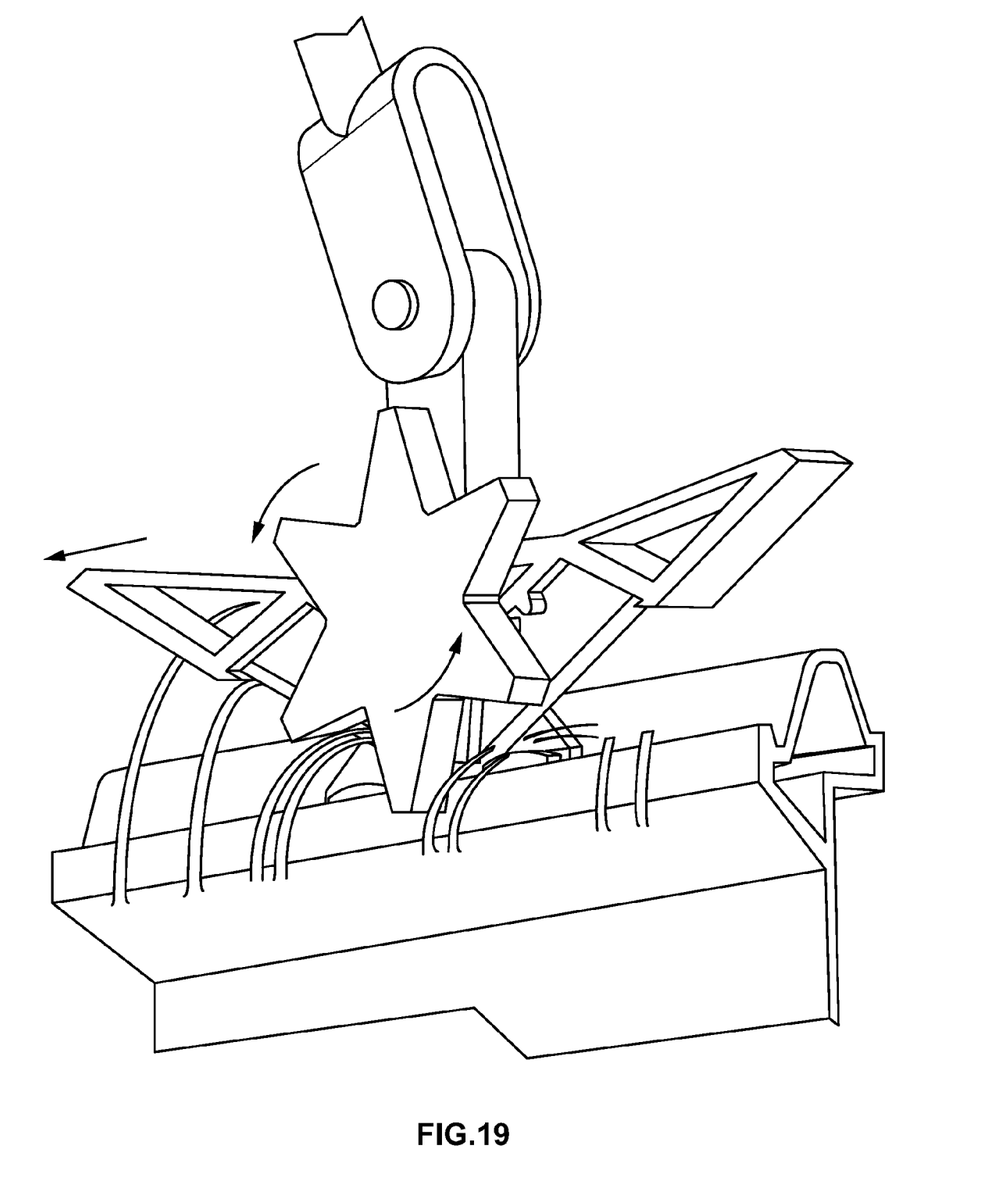
FIG. 19 illustrates a detailed view of grass being cut by the device.

The star-shaped guide 51 may not only act as a counter-weight to balance the weight of the wheel 48 (having a similar weight), but may also act as a guide for the grass 603, bushes, thin branches or other articles as described below. The wheel 48 may add traction to the movable tool 35 so that the movable tool 35 may easily roll along the rail system unit 2 (with reduced friction) and may also allow the star-shaped guide 51 to spin with respect to the movable tool 35. More specifically, because the wheel 48 and star-shaped guide 51 are connected and rotate in unison, the spinning of the wheel 48 when moved along the top 3 of the rail system unit 2 in-turn rotates the star-shaped guide 51 at the same rate as the wheel 48. The star-shaped guide 51 may help separate the vegetation into batches (as a result of the spaces between the stars of the star-shaped guide 51) and may hold the vegetation in place just prior to being cut by the cutting edge 50 as is illustrated in FIG. 19.

Figures 7, 8, 8A:
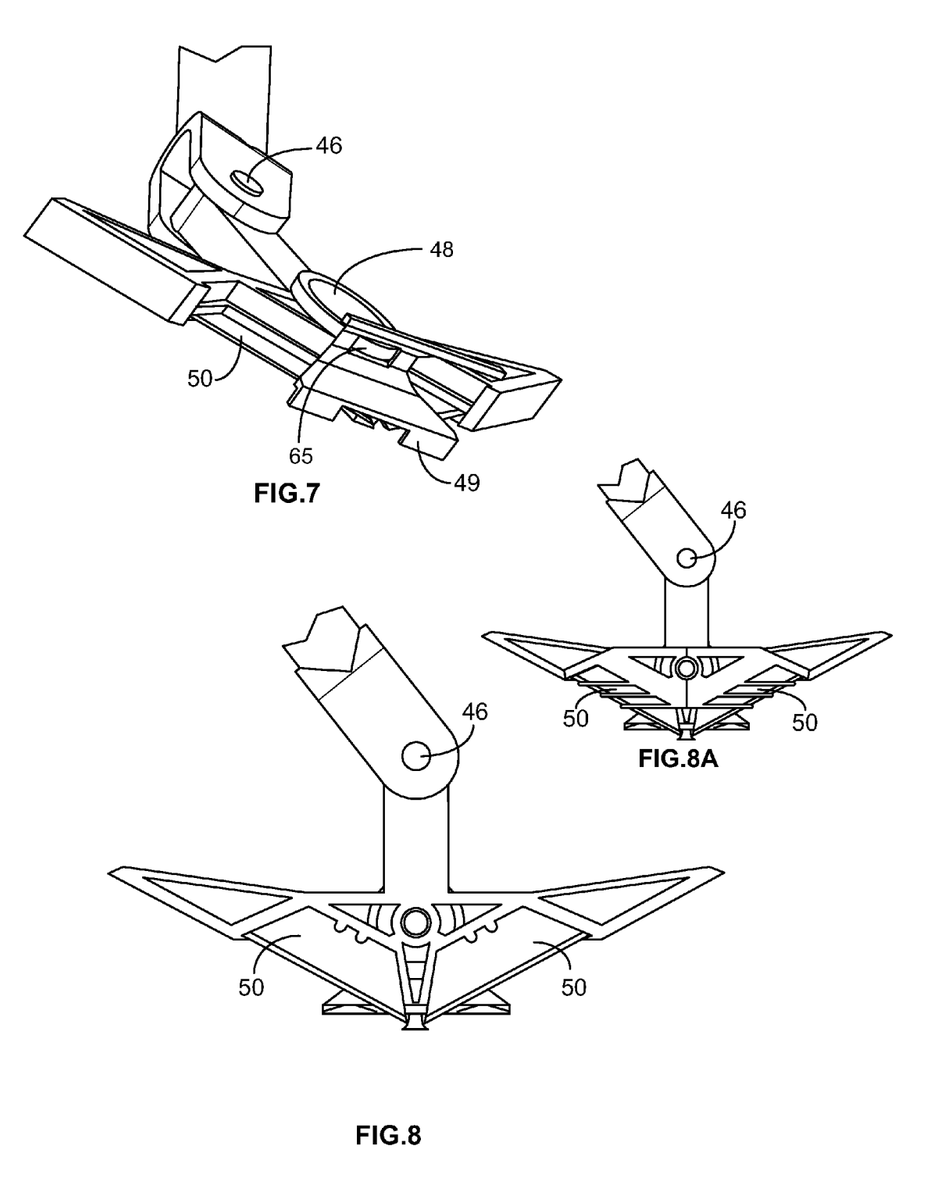
FIG. 7 illustrates a perspective view of the base unit of the movable tool unit of the lawn maintenance device.
FIG. 8 illustrates a detailed view of an embodiment of the movable tool unit of the device wherein the movable unit lacks a wheel to show the cutting blades.
FIG. 8A illustrates the safety shield of the movable tool unit for the embodiment wherein the movable unit lacks a wheel.

Extending below the center section 47B, but still on the base support 45 may be a guide unit 60. The guide unit 60 may be generally curved, having an arch substantially similar to the arch 31 of the top 3 of the rail system unit 2. As a result, when the movable tool unit 35 is placed on the rail system unit 2, the arch of the guide unit 60 may run along the arch 31 at the top 3 of the rail system unit 2 smoothly. The guide unit 60 may have an opening 65 (FIG. 7) which allows the wheel 48 to directly contact the top 3 of the rail system unit 2 so that the wheel 48 directly runs along the rail system unit 2.

Figure 6A:
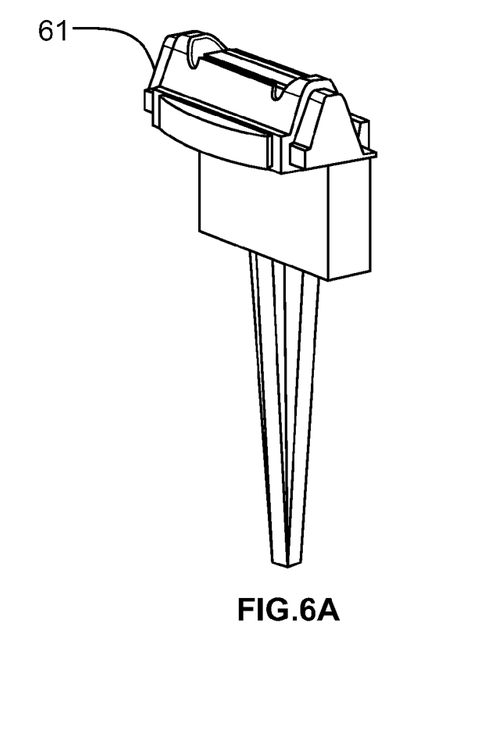
FIG. 6A illustrates a perspective view of the solar light unit.
Figure 6B:
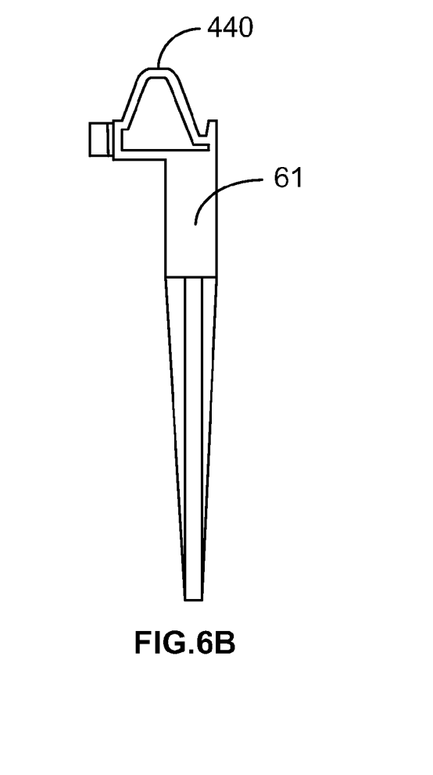
FIG. 6B illustrates a front view of the solar light unit.

Referring now to FIGS. 6, 6A and 6B, an optional solar light 61 may be provided. In an embodiment, the light source may be other than solar, such as battery powered. The device 1 may have a plurality of solar lights 61 added anywhere along the rail system unit 2. The contours of the top of the solar lights 61 may be substantially similar to the top 3 of the rail system unit 2 so that the user may simply move the movable tool unit 35 directly over the solar lights 61 without damaging the solar lights 61 or the movable tool unit 35 as the cutting edge (or blade) 50 of the movable tool unit 35 does not directly contact the solar light 61. In an embodiment, the solar light 61 may be designed to utilize an LED light which shines light out over a sidewalk or driveway. FIG. 6B illustrates the solar light 61 having a top 440 which has a nearly identical curvature as the top 3 of the rail system unit 2.

Figure 14:
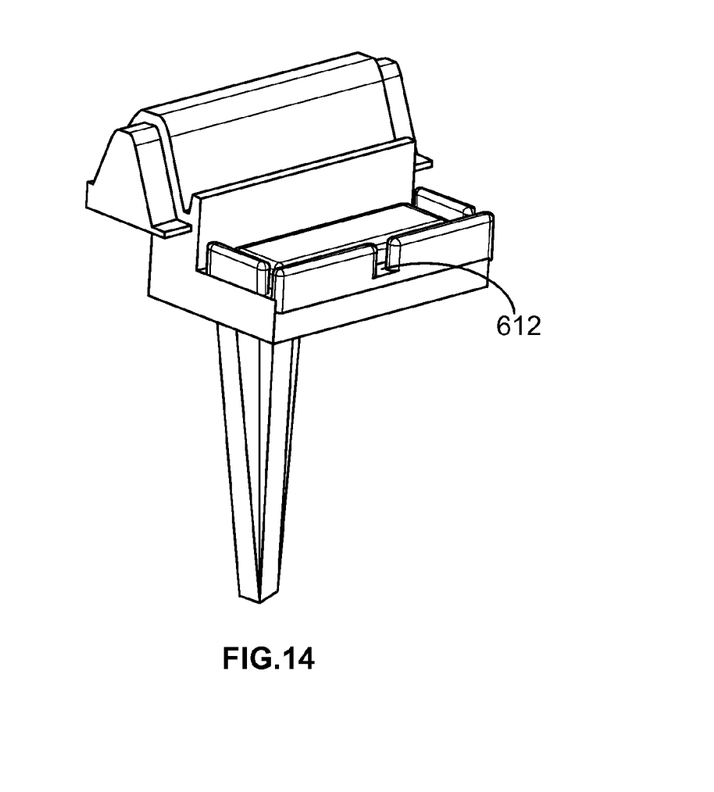
FIG. 14 illustrates a drainage opening for an embodiment of the solar light unit.
Figure 15:
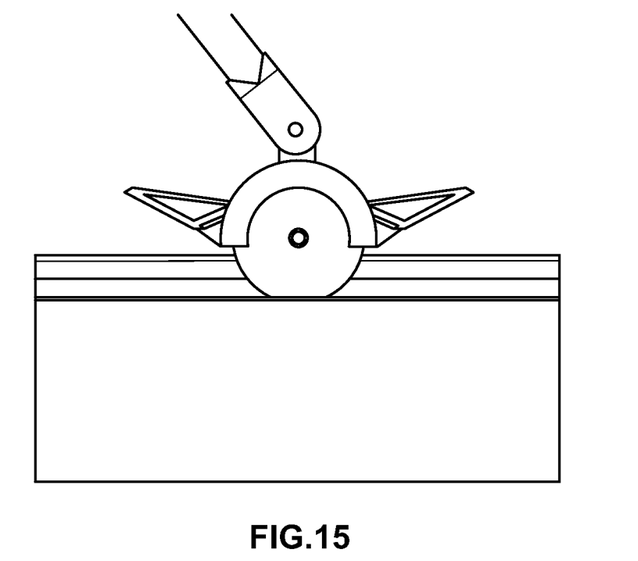
FIG. 15 illustrates a circular cutting blade and protective shield.

In an embodiment, a drainage opening 612 (FIG. 14) may be located on the solar light 61 (FIG. 6A). The drainage opening 612 may prevent water from accumulating on the solar light 61 and causing damage to the electrical components of the solar light 61.

As stated above, located near the bottom 49 of the base support 45 of the movable unit 35 may be a cutting edge (or blade) 50. The cutting edge 50 may be a blade which may be located next to the curved arch portion 60 of the base support 45, between the wheel 48 and the star-shaped guide 51. The cutting edge 50 may extend downward and may be protected in a pocket 80 (FIG. 5A) so that accidental injury to a person or animal is greatly reduced. In an embodiment, the cutting edges 50 are replaceable.

The pocket 80 may be created as a space between a portion of the top 3 of the rail system unit 2 and the bottom 49 (FIG. 7) of the movable tool unit 35. The generally flat cutting portion 32 of the rail system unit 2 may be located at the bottom of the pocket 80. The cutting edge 50 may extend downward toward, but may not touch the generally flat cutting portion 32. The generally flat cutting portion 32 may have an extended lip 71 (FIG. 5A) which runs substantially perpendicular with respect to the generally flat cutting portion 32. The extended lip 71 may provide support for a portion of the bottom 49 of the center portion 47B of the base support 45 of the movable tool unit 35.

To use the device 1, the user first determines the path for which the device 1 will be used. For example, the device 1 may be used along the junction between a lawn and a sidewalk. The rail system unit 2 further may be bent or curved so that the rail system unit 2 follows along, for example, a pond, a tree, a walking path or other areas wherein it is desired to have a distinct line between the lawn and a surrounding area. To utilize the device along a path having a ninety-degree angle, corner pieces like in FIGS. 12 and 13 may be used. The user then partially inserts the rail system unit 2 into the ground 173 along that desired path. More specifically, the user inserts the rail system unit 2 up to generally flat ledge portion 33 which may act as a stop. Once inserted, the majority of the rail system unit 2 remains underground wherein only the top 3 of the rail system unit 2 remains exposed above ground 173. More specifically, the rail system unit 2 may be inserted into the ground 173 for a distance less than the total height 9 of the front 5 and back 6 of the rail system unit 2, but inserted deep enough so as the rail system unit 2 remains sturdy within the ground 173 and becomes immobile.

Once the rail system unit 2 is permanently inserted into the ground, the user places the bottom 49 of the movable tool unit 35 over the top 3 of the rail system unit 2. In particular, the curved 60 bottom portion of the movable tool unit 35 correspondingly aligns with the curved portion 31 of the top 3 of the rail system unit 2 having a similar curvature. Using a curved portion for both the top 3 of the rail system unit 2 and the bottom 60 of the movable tool unit 35 allows the device 1 to rotate toward the sides 7 or 8 of the rail system unit 2 therein providing greater maneuverability of the device 1 overall.

Once the movable tool unit 35 is inserted onto the rail system unit 2, the wheel 48 of the movable tool unit 35 will extend through the opening 65 of the movable tool unit 35 and will directly contact the top 3 of the rail system unit 2. A user then manually pushes (or through electric means in an embodiment) the movable tool unit 35 along the top 3 of the rail system unit 2. As the movable tool unit 35 slides along the top 3 of the rail system unit 2, the cutting edge 50 may slice and cut any grass, bushes or the like which extend over the top 3 of the rail system unit 2; and in particular over the top of the generally flat cutting portion 32 of the rail system unit 2. Further, the first section 47A and third section 47C (which are angled downward to force grass 603 downward toward the cutting edge 50) of the movable tool unit 35 may force grass, bushes or the like down, toward the top 3 of the rail system unit 2 so that more of the lawn may be properly trimmed. In one embodiment 47A and 47C may be adjustable height-wise.

Figures 9D, 9E:
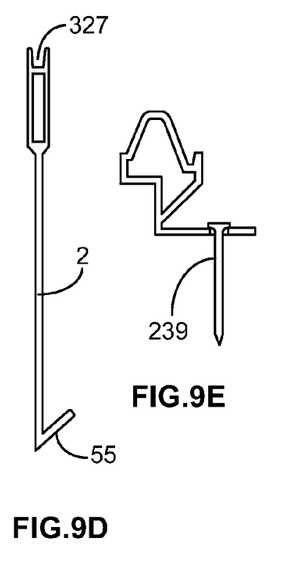
Figure 9F:
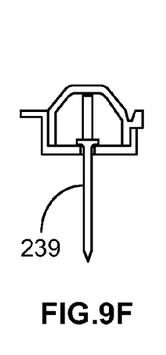
Figure 10:
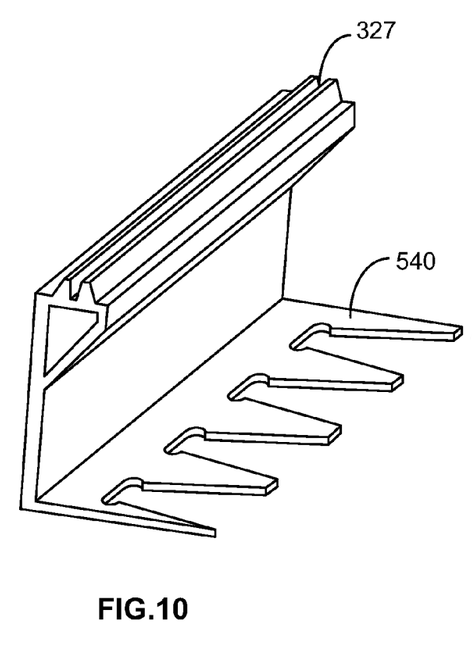
FIG. 10 illustrates a rail system for use with a brick paver edge.
Figure 11:
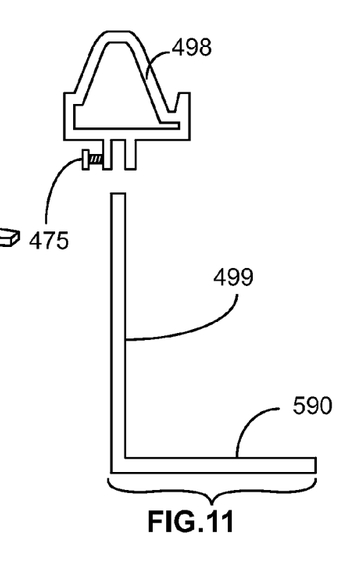
FIG. 11 illustrates a retrofit for existing paver edges.

FIGS. 9E and 9F illustrates a "no dig" embodiment wherein the rail system unit 2 may be simply placed on the ground 173 and utilized. Referring now to FIGS. 10 and 11, in an embodiment the device 1 may simply have an elongated brace 590 which remains secured under, for example, bricks. Still further in an embodiment, the device 1 may have elongated teeth braces 540 which may be secured to the ground via stakes 239. In these embodiments, the rail system unit 2 may not need to be partially inserted into the ground 173.

Finally, in an embodiment, the top 3 of the rail system unit 2 may be removed from the body of the rail system unit (FIG. 11). In this embodiment the top 498 and the bottom 499 may be separated so that the top 498 may be easily interchanged for cleaning, replacement or simply to utilize a top 498 having an alternative curvature without the need to dig up the bottom 499. In this embodiment, the top 498 may be temporarily secured to the bottom by, for example, a screw 475 or the like.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A lawn cutting device comprising:
   a stationary elongated rail system unit having a top, a bottom, a front, a back, a first side and a second side wherein the stationary elongated rail system unit has a length defined by the distance from the front to the back and wherein the bottom of the stationary elongated rail system is secured underground and wherein the top of the stationary elongated rail system remains aboveground;
   a movable cutting tool having a frame having a top, a bottom, a front, a back, a first side and a second side wherein the bottom of the frame of the movable cutting tool moves along the top of the stationary elongated rail system unit;
   a non-circular cutting blade located at the bottom of the movable cutting tool wherein the non-circular cutting blade cuts grass or bushes which are located on the top of or near the top of the stationary elongated rail system unit;
   wherein the top of the stationary elongated rail system unit and the bottom of the frame of the movable cutting tool each have an arch-shaped portion which correspondingly fit together and wherein the arch-shaped portion of the bottom of the frame of the movable cutting tool supports the movable cutting tool on the stationary elongated rail while the non-circular cutting blade cuts the grass or bushes and wherein the non-circular cutting blade of the movable cutting tool is located outside of the arch-shaped portion of the frame of the bottom of the movable cutting tool;
   wherein the arch-shaped portion of the bottom of the frame of the movable cutting tool has a generally flat surface in the middle of the arch-shaped portion;
   a wheel located on the bottom of the movable cutting tool wherein the wheel directly contacts the top of the stationary elongated rail system through an opening in the generally flat surface of the middle of the bottom of the arch-shaped portion of the movable cutting tool; and
   a star-shaped guide unit located on the bottom of the movable cutting tool wherein the star-shaped guide unit groups clumps of grass together to be cut by the non-circular cutting blade of the movable cutting tool and wherein the wheel and star-shaped guide unit move in unison.

2. The lawn cutting device of claim 1 wherein the wheel and the star-shaped guide unit are on opposite sides of the non-circular cutting blade of the movable cutting tool.

3. The lawn cutting device of claim 1 further comprising:
   an opening in the bottom of the movable cutting tool wherein the wheel partially extends through the opening in the bottom of the movable cutting tool and wherein the wheel directly contacts the top of the stationary elongated rail system unit and wherein the movement of the movable cutting tool along the stationary elongated rail system unit rotates the wheel.

4. The lawn cutting device of claim 3 wherein the rotation of the wheel of the movable cutting unit therein rotates the star-shaped guide.

\* \* \* \* \*